United States Patent [19]
Bain

[11] Patent Number: 6,123,307
[45] Date of Patent: Sep. 26, 2000

[54] VEHICLE CUPHOLDER FOR MUGS AND THE LIKE

[75] Inventor: Mark Bain, Sterling Heights, Mich.

[73] Assignee: Chrysler Corporation, Auburn Hills, Mich.

[21] Appl. No.: 08/997,641

[22] Filed: Dec. 23, 1997

[51] Int. Cl.$^7$ .............................. A47K 1/08; B60R 7/00
[52] U.S. Cl. ........................ 248/311.2; 224/282
[58] Field of Search ............... 248/311.2; 224/282, 224/539, 926, 275, 540; 296/37.15; 297/188.15, 188.14, 188.16, 113

[56] References Cited

U.S. PATENT DOCUMENTS

| | | | |
|---|---|---|---|
| D. 268,072 | 3/1983 | Boggs | D6/510 |
| D. 323,932 | 2/1992 | Hudgens | D12/419 |
| 3,163,287 | 12/1964 | Barnett | 224/926 X |
| 4,101,049 | 7/1978 | Wallace et al. | 229/2.5 R |
| 4,218,008 | 8/1980 | Veilleux | 229/2.5 R |
| 4,809,897 | 3/1989 | Wright, Jr. | 224/282 |
| 5,018,633 | 5/1991 | Toth et al. | 248/311.2 |
| 5,022,626 | 6/1991 | Nozel et al. | 248/311.2 |
| 5,102,085 | 4/1992 | Wieczorek et al. | 248/311.2 |
| 5,150,946 | 9/1992 | Marfilius et al. | 297/188.15 |
| 5,205,452 | 4/1993 | Mankey | 224/275 |
| 5,205,525 | 4/1993 | Peck | 248/311.2 |
| 5,280,848 | 1/1994 | Moore | 224/282 |
| 5,337,984 | 8/1994 | Houck | 248/146 |
| 5,628,441 | 5/1997 | Dykstra | 248/311.2 X |
| 5,702,041 | 12/1997 | Sun et al. | 248/311.2 |
| 5,711,503 | 1/1998 | Mitchell, Sr. | 248/311.2 |

*Primary Examiner*—Ramon O. Ramirez
*Assistant Examiner*—Jerome Deluca
*Attorney, Agent, or Firm*—Roland A. Fuller, III

[57] ABSTRACT

A center console having a storage compartment and an access opening with a lid pivotally attached to the storage compartment for closing the opening. A cupholder is attached to the front of the storage compartment and includes a plastic body portion having three generally cylindrical, recessed cup-receiving portions. Two of the cup-receiving portions are joined by a recessed channel portion capable of receiving a handle of a mug received in one of at least two cup-receiving portions.

3 Claims, 2 Drawing Sheets

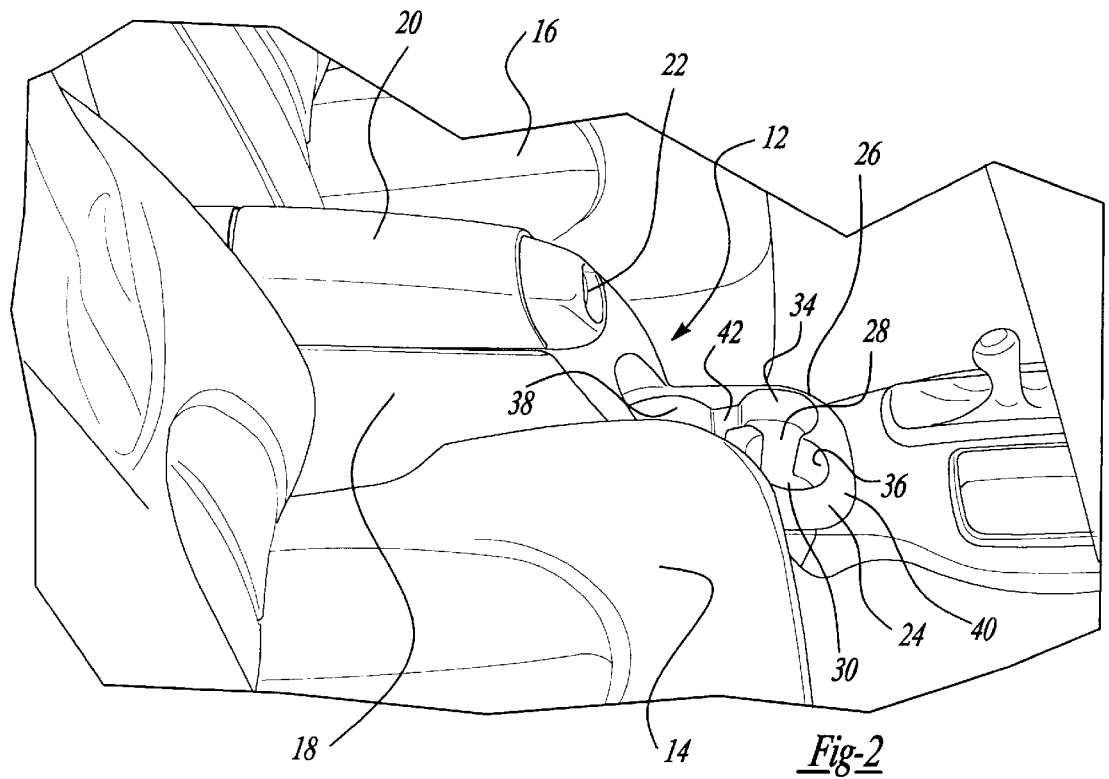
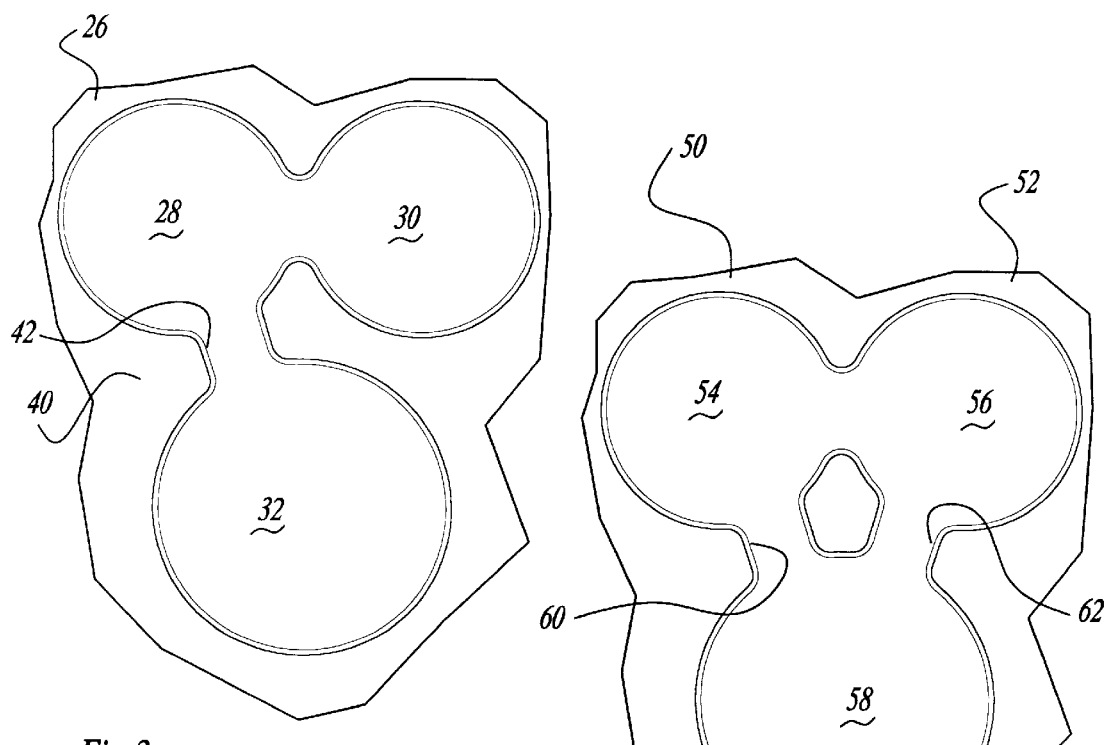

VEHICLE CUPHOLDER FOR MUGS AND THE LIKE

BACKGROUND OF THE INVENTION

1. Field of the Invention

The present invention relates generally to vehicles and an apparatus for vehicles for increasing driver and passenger convenience within the vehicle and, more particularly, to a cupholder which accommodates a handle such as for a mug, so that the handle of the mug does not interfere with having the cup or mug fit properly into the cupholder.

2. Description of the Related Art

With the ever-increasing time demands that people face, people continually attempt to economize their lifestyles in order to maximize their available time. For example, in years past, a morning ritual typically included eating breakfast and finishing ones last cup of coffee or juice prior to departing for work. More recently, people tend to grab a bagel and a cup of coffee or juice on their way out the door for consumption during their commute into work. Further, many people forego making any breakfast and stop for coffee or juice on their way into work.

In order to facilitate this process, automobile manufacturers have typically included some form of cupholder or platform on which to place a cup in order to facilitate driving while drinking, coffee, juice, or other beverages. Initial cupholders were of a size to accommodate a twelve or sixteen fluid ounce can, bottle, or other beverage container. More recently, however, many home stores, coffee shops, bagel establishments, and other entrepreneurs have introduced twenty-four and thirty-two fluid ounce containers for holding beverages. These containers typically are large plastic containers having a handle along the side. While automobile manufacturers have most recently attempted to accommodate the increased diameter of the containers, no automobile manufacturer has yet to consider accommodating the often bulky handles which may prevent the beverage container from being placed in a cupholder and remaining level.

Thus, it is an object of the present invention to provide a cupholder which accommodates enlarged beverage containers.

It is yet a further object of the present invention to provide a cup holder which accommodates enlarged beverage containers having handles which would otherwise prevent placement of the container within the cupholder.

It is yet a further object of the present invention to provide a center console which accommodates the cupholder of the present invention so that an enlarged container can be placed in the center console without interference from the handle of the container.

SUMMARY

A cupholder including a body having at least two recessed cup-receiving receptacles which are spaced apart. A channel is formed in the body between the cup-receiving receptacles for receiving a handle of a mug or the like which is placed in one of the receptacles.

A center console for a vehicle includes a storage compartment having an opening and a lid attached to the storage compartment for closing the opening. A cupholder is attached to the front of the storage compartment. The cupholder includes a plastic body portion including at least two generally cylindrical recessed sections which are spaced apart. The cup receiving sections are joined by a recessed channel which receives the handle of the mug received in one of the two cup receiving sections joined by the channel.

Additional objects, features and advantages of the present invention of the present invention will become apparent in the following description and the appended claims taken in connection with the accompanying drawings.

BRIEF DESCRIPTION OF THE DRAWINGS

FIG. 2 is a partial perspective view of the center console and cupholder as arranged in accordance with the principals of the present invention;

FIG. 3 is a top view of a first embodiment of a cupholder having a single channel joining two cup perceiving sections to accommodate the handle of a mug or the like; and FIG. 4 is an alternative embodiment of the cupholder of the present invention.

DETAILED DESCRIPTION OF THE INVENTION

Figure 1:
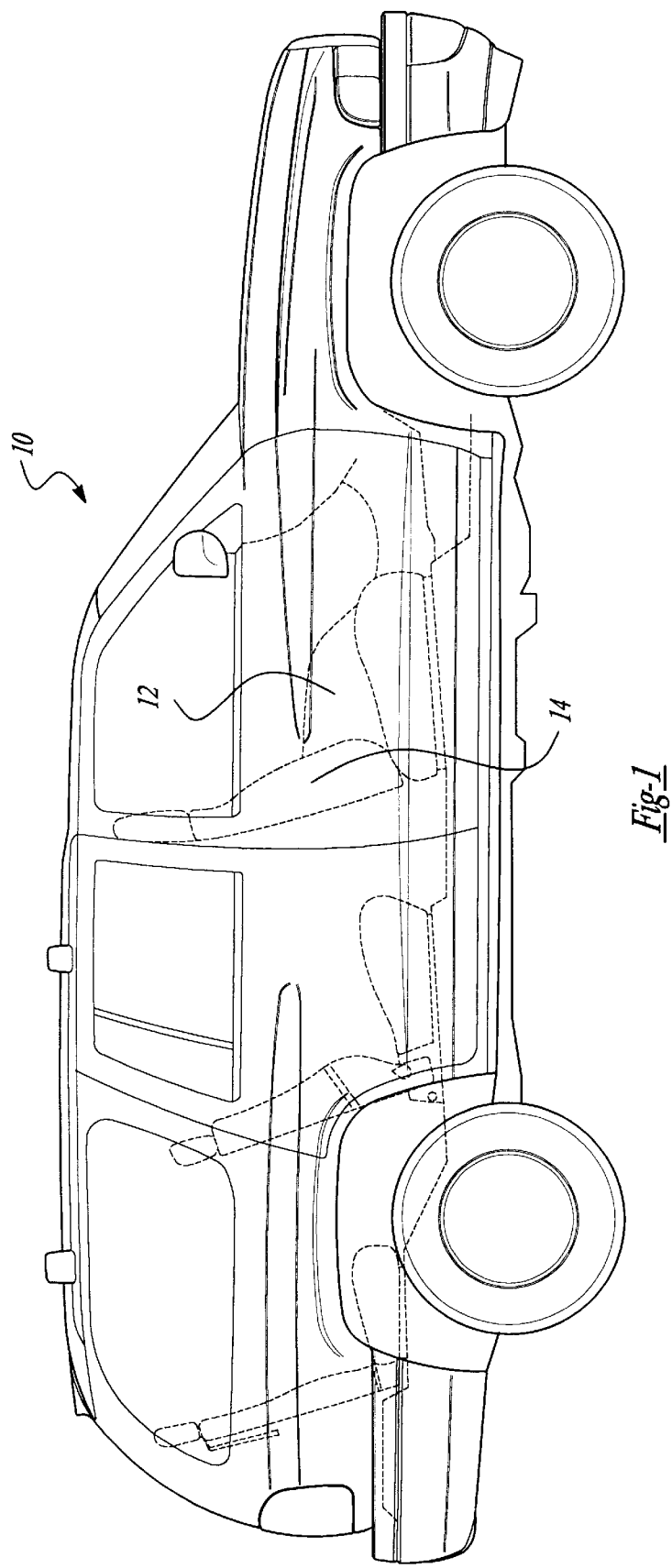
FIG. 1 is a side view of a vehicle arranged in accordance with the present invention.

Referring to FIG. 1, a vehicle 10 is arranged in accordance with the principals of the present invention. The vehicle 10 is shown herein as a sport utility vehicle, but one skilled in the art will recognize that the principals of the present invention apply to other vehicles including coupes, sedans, station wagons, vans, and any other vehicle which is desirable to have an apparatus for holding a cup. The vehicle 10 includes a center console 12, shown in phantom, which is arranged between a passenger seat 14, shown in phantom, and a drivers seat 16, shown in FIG. 2.

Center console 12 includes a storage compartment 18 having a lid 20 which opens and closes to allow access to storage compartment 18. Lid 20 may have either rear or side hinges which enable lid 20 to pivot with respect to storage compartment 18. Lid 20 may also include a latch or catch mechanism 22 for maintaining lid 20 in a closed position. Center console 12 also includes a forward portion or section 24 which includes a cupholder 26.

With reference to FIGS. 2 and 3, cupholder 26 includes a plurality of recessed cup-receiving receptacles 28, 30, and 32 formed in a body 40. Cup-receiving receptacles 28, 30, and 32 are generally cylindrical receptacles having arcuate side walls 34, 36, and 38 respectively. Arcuate side walls 34, 36, and 38 extend upwardly from the cupholder floor 27 that defines the bottom of the cylindrical receptacles 28, 30, and 32. Cup-receiving receptacles 28, 30, and 32 are recessed to accommodate a cup or mug inserted therein to maintain a cup or mug substantially level and to prevent the cup or mug from sliding within the respective cup-receiving receptacle. Cup-receiving receptacles 28 and 30 may be of similar or different diameters, and cup-receiving receptacle 32 is generally a greater diameter than cup receiving receptacles 28 and 30. Body 40 includes a channel 42 formed between cup-receiving receptacles 28 and 32. Channel 42 is formed so that if a cup or mug having a handle is placed in either of cup-receiving receptacles 28 or 32, the handle of the cup or mug is recessed within channel 42. In this manner, a cup, mug, or other beverage container having a handle may be placed in either or both of cup-receiving receptacles 28 or 32, and the body 40 of cupholder 26 will not interfere with the handle of the cup, mug, or other beverage container. Further, if a cup, mug, or other beverage container having a handle is placed in both cup-receiving receptacles 28 and 32, the channel 42 is both wide enough and long enough to accommodate two handles at once. Arcuate side wall 34 defines a substantial portion of cylindrical receptacle 28. Arcuate side wall 36 defines a substantial portion of cylindrical receptacle 30 and arcuate side wall 38 defines a substantial portion of cylindrical receptacle 32. Arcuate side wall 34 and arcuate side wall 38 are interconnected by a first joining wall 70. Arcuate side wall 34 and arcuate side wall 36 are interconnected by a second joining wall 72. A projection 74 is formed projecting from floor 27 and defines a portion 75 of cylindrical receptacle 28, a portion 76 of cylindrical receptacle 30 and a portion 77 of cylindrical receptacle 32. Projection 74 is interconnected to arcuate side walls 36 and 38 and acts to separate cylindrical receptacles 30 and 32.

Referring to FIG. 4, an alternative embodiment of the present invention is shown. FIG. 4 shows a cupholder 50 having a body 52 and three recessed cup-receiving receptacles 54, 56, and 58 formed in body 52. Cupholder 50 is configured similarly as described as in FIGS. 2 and 3 with the addition of a second channel 62 between cup-receiving receptacles 56 and 58. In particular, cupholder 50 includes a first channel 60 formed in body 52 between cup-receiving receptacles 54 and 58. Cupholder 50 also includes a second channel 62 formed between cup-receiving receptacles 56 and 58. In this manner, a beverage container having a handle may be placed so that the handle faces the driver's side of the vehicle when placed in channel 60 or the passenger side of the vehicle when placed in channel 62. Thus, cupholder 50 is ergonomically designed for ease of use by either a driver or a passenger. Arcuate side wall 34 defines a substantial portion of cylindrical receptacle 54. Arcuate side wall 36 defines a substantial portion of cylindrical receptacle 56 and arcuate side wall 38 defines a substantial portion of cylindrical receptacle 58. Arcuate side wall 34 and arcuate side wall 38 are interconnected by a first joining wall 80. Arcuate side wall 34 and arcuate side wall 36 are interconnected by a second joining wall 82. Arcuate side wall 36 and arcuate side wall 38 are interconnected by a third joining wall 84. A projection 90 is formed projecting from floor 27 and defines a portion 91 of cylindrical receptacle 54, a portion 92 of cylindrical receptacle 56 and a portion 93 of cylindrical receptacle 58. Projection 90 is separated from first joining wall 80 by a distance 95. Projection 90 is also separated from second joining wall 82 by a distance 94 and from third joining wall 84 by a distance 96.

One skilled in the art will recognize that various modifications of the present invention may be made. For example, rather than having cup-receiving recepticals 28 and 30, (54 and 56) intersecting, a channel may be formed between cup-receiving receptacles 28 and 30 (54 and 56). Further, the relative diameters of each cup-receiving receptacle may vary in accordance with space limitations and design preference, and may be uniform or non-uniform.

In view of the foregoing, it can be seen that the present invention provides a novel apparatus for receiving a cup, mug, or other beverage container having a handle which would otherwise prevent proper placement of the beverage container in the cupholder. In particular, a channel is formed between two or more of the cup-receiving receptacles to accommodate a beverage container having a handle.

Although the invention has been described with particular reference to certain embodiments thereof, variations, and modifications can be effected within the spirit and scope of the following claims.

What is claimed is:

1. A cupholder for holding at least one cup having a cup handle extending therefrom, said cupholder comprising:

a body having a floor;

a first, second, and third arcuate side wall extending upward from said floor, said first arcuate side wall forming a substantial portion of a first cylindrical receptacle, said second arcuate side wall forming a substantial portion of a second cylindrical receptacle, said third arcuate side wall forming a substantial portion of a third cylindrical receptacle; and a projection extending upward from said floor defining a portion of said first, second, and third cylindrical receptacles;

wherein said first and third arcuate side walls are interconnected by a first joining wall, said first and second arcuate side walls are interconnected by a second joining wall, said projection being separated from said first joining wall by a first distance, and said projection being separated from said second joining wall by a second distance, said first distance and said second distance being capable of receiving a cup handle.

2. The cupholder as set forth in claim 1, wherein said second and third arcuate side walls are interconnected by a third joining wall, said projection being separated from said third joining wall by a third distance.

3. The cupholder as set forth in claim 1, wherein said projection is interconnected with said second and third arcuate side walls.

* * * * *